United States Patent [19]
Bauer et al.

[11] Patent Number: 4,973,506
[45] Date of Patent: Nov. 27, 1990

[54] COMPOSITE PLATE FOR THE FACING OF BUILDING SURFACES

[75] Inventors: Rudolf Bauer, Bad Säckingen, Fed. Rep. of Germany; Peter H. Lynam, Cambridge, England

[73] Assignee: Ciba-Geigy AG, Basle, Switzerland

[21] Appl. No.: 263,282

[22] Filed: Oct. 27, 1988

[30] Foreign Application Priority Data

Oct. 30, 1987 [CH] Switzerland ............... 4266/87

[51] Int. Cl.$^5$ ............................................. B32B 3/12
[52] U.S. Cl. ................................. 428/73; 52/612;
52/806; 428/116; 428/280
[58] Field of Search ........... 428/73, 116, 280, 117,
428/118; 52/806, 612

[56] References Cited

U.S. PATENT DOCUMENTS

| | | | |
|---|---|---|---|
| 3,723,233 | 3/1973 | Bourke | 428/118 |
| 4,292,872 | 10/1981 | Brinker | 83/866 |
| 4,299,872 | 11/1981 | Miguel et al. | 428/117 |
| 4,358,500 | 11/1982 | George et al. | 428/251 X |
| 4,476,175 | 10/1984 | Forry et al. | 428/281 X |
| 4,477,605 | 10/1984 | Okubo et al. | 428/288 X |
| 4,508,777 | 4/1985 | Yamamoto et al. | 428/280 |
| 4,598,007 | 7/1986 | Kourtides et al. | 428/116 |

FOREIGN PATENT DOCUMENTS

| | | | |
|---|---|---|---|
| 2239573 | 3/1973 | France | 428/118 |
| 2222509 | 10/1974 | France | 428/116 |

OTHER PUBLICATIONS

German Industry Standard DIN 4102,B1 Fire Behaviour of Building Materials and Building Components, May 1981.

*Primary Examiner*—Henry F. Epstein
*Attorney, Agent, or Firm*—Burns, Doane, Swecker & Mathis

[57] ABSTRACT

A composite plate contains a core layer with a honeycomb structure between two cover layers, the first cover layer of which carries a decorative panel and the second cover layer of which carries a rear protective plate. The adhesive bonds of the composite plate consist of a layer of a relatively nonflammable adhesive. The protective element, made of a silicate base (but without asbestos) or a non-combustible mineral substance base, is adhesively bonded to the rear side of the composite plate.

26 Claims, 1 Drawing Sheet

U.S. Patent  Nov. 27, 1990  4,973,506
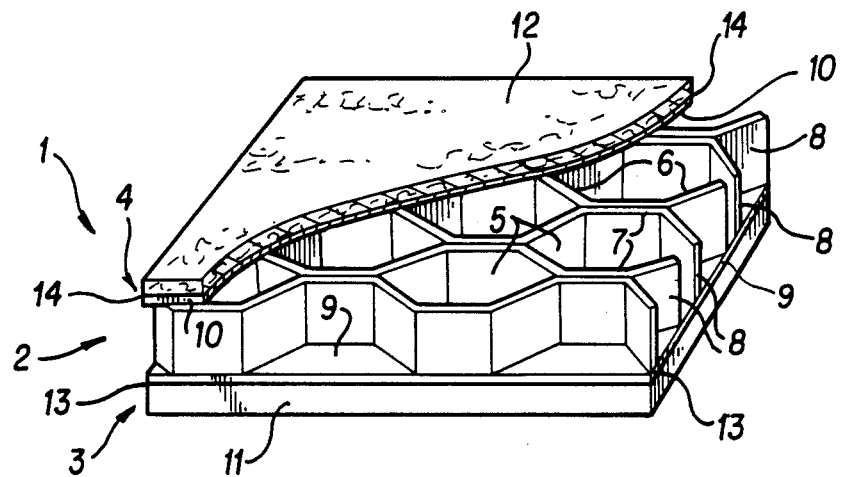
Figure

COMPOSITE PLATE FOR THE FACING OF BUILDING SURFACES

BACKGROUND OF THE INVENTION

The invention concerns a composite plate for the facing of building surfaces, and in particular relates to facades having light weight structures, with a core layer extending between two cover sheets. A decorative panel, in particular a natural stone panel, is adhesively bonded to the outward facing surface of one of the two cover sheets.

Composite plates having a decorative panel of marble and a core layer with a metallic honeycomb structure are known from U.S. Pat. No. 3,723,233. Due to their light weight and high dimensional stability, such plates are increasingly being used for the external and internal facing of buildings, halls, railroad and subway stations, baths, swimming pools, and internal installations, in particular on ships. However, the known composite plates in the form of light weight natural stone panels only satisfy the pertinent national fire specifications under certain limited conditions. In particular, the known composite plates do not satisfy the requirements of the more stringent fire testing procedures for facing plates according to DIN (German Industry Standard) 4102 B1.

This is also true for the composite plates known from U.S. Pat. No. 4,299,872 and U.S. Pat. No. 4,598,007, in spite of the application of certain fire protection measures, such as the use of nonflammable adhesives (U.S. Pat. No. 4,598,007) or the filling of the honeycomb layer with material which foams in the event of fire or in response to the effect of heat (U.S. Pat. No. 4,299,872).

These references do not mention the use of plates for the facing of buildings, where the decisive factor is neither the protection against heat nor the light weight of the plate, but rather the cohesion of the plates in the event of fire. In buildings, the falling parts of the plates would endanger persons, in particular fire fighters employed in controlling the fire. The composite plates mentioned in French Patent Publication No. 2,239,573 are again not designed for the outside facing of the buildings. Furthermore, this reference proposes the use of asbestos, which in view of its harmful effects on health, is no longer used.

SUMMARY OF THE INVENTION

It is an object of the invention to create composite plates of the above-mentioned type which are optimally resistant in the event of fire or in response to the heat generated by fire with respect to both the cohesion of the composite and with respect to flammability and charring. DIN 4102, B1 specifies, for example, that a specimen body of a predetermined dimension, must retain a minimum residual length after a flame test in a fire shaft under predetermined conditions. The residual length is defined as the part of the specimen not burned or charred either inside or outside.

The above defined object is attained according to the invention by fastening the decorative panel to the first cover sheet by means of a relatively nonflammable adhesive. On the reverse side of the composite plate, a protective panel of a non-combustible mineral material is fastened to the surface of the second cover sheet by means of a relatively nonflammable adhesive.

This design of the composite plate according to the invention satisfies DIN z4102, B1.

In a preferred embodiment, the core layer consists of a metallic honeycomb structure and the protective plate is a silicate panel. The protective plate is made of a silicate basis without asbestos, is usually 2 to 6 mm thick and is as light as possible. The protective plate may also be made of a non-combustible intumescent material, which foams and insulates in the event of fire (for example potassium silicate or sodium silicate). It may further contain mineral fillers, in particular mica or microballons.

BRIEF DESCRIPTION OF THE DRAWINGS

Other objects and advantages of the present invention will become more apparent from the following detailed description of preferred embodiments as described in conjunction with the accompanying drawings in which:

The figure shows a sectioned composite plate according to the invention.

DETAILED DESCRIPTION OF THE INVENTION

The composite plate 1 shown perspectively in section in the figure consists of a core layer 2, a front cover layer 3 and a cover layer 4 on the rear side. The composite plate 1 may be fitted in a noncombustible frame, not shown. This frame usually consists of a metal. It is appropriate to seal the framed composite plates 1 with silicone rubber.

In a preferred embodiment, for example, a supporting aluminum frame sealed with silicone rubber is provided. The composite plate 1 is optionally fastened with or without frame to a substructure or to the external wall of a building. The composite plate forms a cladding facade or a light weight facing element that is particularly attractive architectonically and aesthetically, with the light weight of the composite plate resulting from its structure as described below, said structure having a high dimensional stability and being relatively nonflammable. The composite plate 1 is suitable for both the external and internal facing of buildings, halls, railroad and subway stations, baths, swimming pools, internal installations of ships, and the like. In particular, the composite plate 1 may be designed in the form of a light weight natural stone structural plate in a manner as described below.

As seen from the perspective in the figure, the core layer 2 has a honeycomb structure with a plurality of cells 5, the walls of which consist of a metal, preferably aluminum and extend at right angles to the plane of the composite plate 1. The cells 5 have a hexagonal honeycomb shape and may be made of expanded aluminum honeycombs.

As is seen, the honeycomb structure comprises single wall partitions 6 and double wall partitions 7. In the area of the double wall partitions 7, the partition strips 8 are adhesively bonded or welded to each other. A phenol resin adhesive or, in order to increase fire safety, a relatively nonflammable adhesive may be used in the adhesive bonding.

In place of the core material shown in the figure with a honeycomb structure, the core layer 2 may also consist of a foam core, to form a sandwich structure.

The front COVer layer 3 contains a first cover layer 9 which, together with a second cover layer 10 of the rear cover 4 and the core layer 2, represents a honeycomb sandwich structure. The first cover layer 9 and the second cover layer 10 are adhesively bonded to the partition strip 8 of the preferably metallic honeycomb structure of the core layer 2, by preferably using a noncombustible or relatively nonflammable adhesive. The sandwich structure statically acts as a double T support, with the cover layers 9, 10 corresponding to the flanges and transmitting the tensile and compressive stresses generated by a bending load. The core layer 2 corresponds to the web of the double T support for transmitting shear stresses. However, in contrast to adhesively applied profiles, the honeycomb structure provides a stiffening effect in all directions. Sandwich structures of this type have a series of advantages, such as making light weight structures characterized by high dimensional stability possible, for use particularly in areas endangered by earthquakes. The composite plates 1 described above are further distinguished by simplified application methods and an aesthetic appearance. They are therefore, applicable not only throughout the construction industry, but also with respect to internal installations of any kind, and particularly where hygiene and simplicity of cleaning must be emphasized. Furthermore, composite plates 1 of the type described above are especially appropriate in locations where architectonic requirements and designs require prestigious materials.

The first cover layer 9 and the second cover layer 10 consist of two layers of glass fiber laminates, in particular glass fiber reinforced epoxy resin laminates, or aluminum plates. While the structural height of the cells 5 together with the thickness of the core layer 2 covered on both sides by fiber laminates amounts to about 20 mm, the thickness of the two cover layers 9, 10 is for example 0.5 mm.

The adhesively bonded honeycombs and cover layers 9, 10 form an intermediate layer, which is covered on the front side of the composite plate 1 by a decorative panel 11 and on the rear side by a protective plate 12.

The architectonically effective decorative panel 11 is adapted, depending on the application, for use as external or internal cladding. If the composite plate 1 is to be used as a light weight facing element, the decorative panel is a natural stone plate, for example of marble. As a function of their use on external faces or internal walls of buildings or for cladding on internal installations, the decorative panel 11 may have aesthetically different appearances.

The decorative panel 11 is usually 2 to 10 mm thick and forms, together with the first cover layer 9, the cover sheet 3 on the front side of the composite plate 1. Between the decorative panel 11 and the first cover layer 9, an adhesive layer 13 is located, represented in the figure by a line slightly broadened relative to the other lines. The core layer 2 consists, as shown, of a metal honeycomb structure, in particular of aluminum or another non-combustible material. The cover layers 9, 10 consist of fiber-reinforced plastics or a metal.

The decorative panel 11, which is in particular a natural stone layer, is bonded by means of the adhesive layer 13, which is a relatively nonflammable layer, to the first cover layer 9. The adhesive of the adhesive layer 13 is not combustible or is relatively nonflammable, thereby satisfying the applicable governmental regulations. Adhesives based on epoxy resins with metal oxide additions, for example aluminum oxide, may be used as the relatively nonflammable adhesives. Thus, for example, an industrial diglycide ether based on brominated bisphenol-A with a filler, such as aluminum oxide may be used. Other halogenated adhesives with additions of mineral fillers and/or metal oxides, and facing adhesives with special formulations, wherein the composition of the individual components yields a synergism assuring a high flame stability of the adhesive as defined in the standard DIN 4102 may also be used.

In order to be able to use the composite plate 1 as a relatively nonflammable structural material, the rear side is provided with the aforementioned protective plate 12, the thickness of which is for example between 2 and 6 mm, so that the composite plate 1 will have a total thickness of about 25 to 40 mm.

If the composite plate 1 is used without the protective plate 12 as a light weight facing element, the intermediate space between the building wall and the composite plates 1 may produce, in the event of a fire, a chimney effect, leading to a high thermal stress on the composite plates 1 and to the propagation of the fire. The protective plate 12 acts, according to the invention, as a rear protective element. That is, on the one hand the protective plate 12 represents a rear thermal insulation for the composite plate 1, and on the other hand it consumes thermal energy when the crystal water bound in the protective plate 12 is released and evaporated. Furthermore, a protective plate 12 which foams in the event of fire, is able to seal the air gap between the composite plates 1 and the building surface, thereby extensively suppressing the chimney effect. In the event of fire, the protective plate 12 assures the integrity of the composite plates 1.

The rear cover layer 4 contains an adhesive layer 14 between the second cover sheet 10 and the protective plate 12, which again consists of a non-combustible adhesive or an adhesive belonging to the group of relatively nonflammable binders, which satisfy the applicable governmental regulations.

The adhesively bonded protective plate 12 is preferably about 2 to 6 mm thick and as light as possible. It is made on a silicate basis, but is free of asbestos. The protective plate may also be produced using non-combustible mineral substances.

The protective plate 12 may also be made of non-combustible intumescent substances (for example potassium or sodium silicate) which foam and insulate in the event of fire.

The combination of a silicate with a filler results in an especially effective rear protective element. Preferably, materials with alkali silicates and in particular water glass, are used. In addition to sodium silicate and potassium silicate, calcium silicate may also be considered as an effective component. As binders, mineral binders and/or microballons are appropriate.

A particularly effective protective plate 12 consists of wollastonite felt mat, bonded with calcium silicate and containing as an additional mineral filler, mica. Following impregnation, the protective plate 12 is pressed to the desired thickness and dried.

The use of a calcium silicate plate as the protective plate 12 in combination with the aforementioned relatively nonflammable adhesives again makes it possible to produce composite plates 1 of the aforedescribed type, which withstand even the tightened fire testing procedures and are characterized by a high frame stability.

It is, of course, possible to embody the invention in other specific forms than those of the preferred embodiment described above. This may be done without departing from the essence of the invention. The preferred embodiment is merely illustrative and should not be considered restrictive in any way. The scope of the invention is embodied in the appended claims rather than in the preceding description and all variations and changes which fall within the range of the claims are intended to be embraced therein.

What is claimed is:

1. Composite plate for the cladding of building surfaces, in particular for light weight facings, comprising:
   a first and a second cover layer;
   a core layer extending between said first and second cover layers;
   a decorative panel, adhesively bonded to said first cover layer by means of a flame retardant adhesive; and
   an asbestos-free protective plate, formed of a non-combustible, intumescent mineral substance containing an alkali silicate, bonded on a rear side of the composite plate to a surface of the second cover layer by means of a flame retardant adhesive.

2. Composite plate according to claim 1, wherein the core layer consists of a non-combustible material.

3. Composite plate according to claim 2, wherein, the core layer is formed as a metallic honeycomb structure.

4. Composite plate according to claim 3, wherein the first and second cover layers consist of fiber reinforced plastics.

5. Composite plate according to claim 3, wherein the first and second cover layers consist of a metal.

6. Composite plate according to claim 4, which is set into a non-combustible, metallic, frame.

7. Composite plate according to claim 5, which is set into a non-combustible, metallic. frame.

8. Composite plate according to claim 6, which is sealed along its edge with a silicone rubber.

9. Composite plate according to claim 7, which is sealed along its edge with a silicone rubber.

10. Composite plate according to claim 8, wherein the alkali silicate is potassium silicate or sodium silicate.

11. Composite plate according to claim 9, wherein the alkali silicate is potassium silicate or sodium silicate.

12. Composite plate according to claim 8, wherein the protective plate comprises a calcium silicate.

13. Composite plate according to claim 9, wherein the protective plate comprises a calcium silicate.

14. Composite plate according to claim 8, wherein the protective plate comprises a mineral filler.

15. Composite plate according to claim 9, wherein the protective plate comprises a mineral filler.

16. Composite plate according to claim 12, wherein the protective plate is made of a wollastonite felt mat, bonded with calcium silicate and comprising mica as an additional mineral filler.

17. Composite plate according to claim 13, wherein the protective plate is made of a wollastonite felt mat, bonded with calcium silicate and comprising mica as an additional mineral filler.

18. Composite plate according to claim 14, wherein the protective plate is made of a wollastonite felt mat, bonded with calcium silicate and comprising mica as an additional mineral filler.

19. Composite plate according to claim 15, wherein the protective plate is made of a wollastonite felt mat, bonded with calcium silicate and comprising mica as an additional mineral filler.

20. Composite plate according to claim 10, wherein the protective plate comprises microballons as a filler.

21. Composite plate according to claim 11, wherein the protective plate comprises microballons as a filler.

22. Composite plate according to claim 16, wherein the protective plate comprises microballons as a filler.

23. Composite plate according to claim 17, wherein the protective plate comprises microballons as a filler.

24. Composite plate according to claim 18, wherein the protective plate comprises microballons as a filler.

25. Composite plate according to claim 19, wherein the protective plate comprises microballons as a filler.

26. Composite plate according to claim 1, wherein the decorative panel is a natural stone plate.

* * * * *